Figure 1:
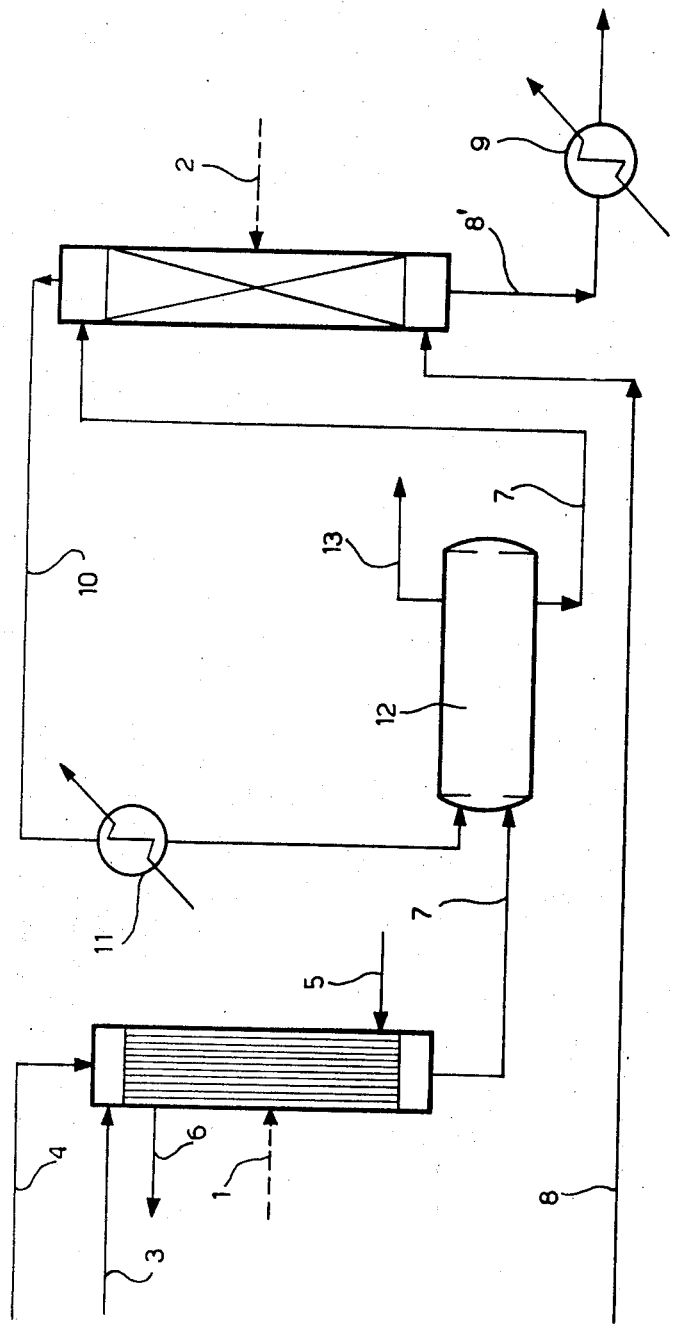

United States Patent [19]
Di Fiore et al.

[11] 3,807,139
[45] Apr. 30, 1974

[54] PROCESS FOR THE MANUFACTURE OF CONCENTRATED AQUEOUS SOLUTIONS OF HYDROGEN CHLORIDE

[75] Inventors: Lucio Di Fiore, Milan; Sergio Quarta, Monza, both of Italy

[73] Assignee: Societa'Italiana Resine S.I.R. S.p.A., Milan, Italy

[22] Filed: Oct. 27, 1972

[21] Appl. No.: 301,408

[30] Foreign Application Priority Data
Nov. 17, 1971  Italy .............................. 31203 A/71

[52] U.S. Cl. .................................................. 55/71
[51] Int. Cl. ........................................... B01d 19/00
[58] Field of Search .................... 55/46, 48, 51, 71

[56] References Cited
UNITED STATES PATENTS

| | | | |
|---|---|---|---|
| 3,242,648 | 3/1966 | Young et al. | 55/71 |
| 3,387,430 | 6/1968 | Shvadi | 55/71 |
| 3,422,599 | 1/1969 | Hildyard | 55/71 |

*Primary Examiner*—Charles N. Hart
*Attorney, Agent, or Firm*—Sughrue, Rothwell, Mion, Zinn & Macpeak

[57] ABSTRACT

Hydrogen chloride produced in organic reactions is recovered as hight grade 32 to 33 percent hydrochloric acid by a combination of isothermal and adiabatic absorption steps.

4 Claims, 1 Drawing Figure

PROCESS FOR THE MANUFACTURE OF CONCENTRATED AQUEOUS SOLUTIONS OF HYDROGEN CHLORIDE

The present invention relates to improvements in the manufacture of aqueous solutions of hydrogen chloride.

More particularly, it relates to the recovery, in the form of an aqueous solution, of the hydrogen chloride which develops generally as a gaseous by-product of organic reactions.

There are various organic reactions in which gaseous hydrogen chloride develops as a by-product. For the purpose, it will be sufficient to recall substitutive chlorination by gaseous chlorine of organic compounds, pyrolysis (dehydrochlorination) of chlorinated hydrocarbons and the alkylation of aromatic compounds by means of chloroalkylic alkylating agents.

The gaseous hydrogen chloride which develops in such processes is contaminated to a greater or lesser degree by the presence of substances of an organic nature. Since the recovery of such acid normally occurs by the use of water, the problem consists in obtaining aqueous solutions of hydrogen chloride with a high concentration of the acid (generally of the order of 32 to 33 percent by weight) bereft, or as bereft as possible, of contaminants of an organic nature.

In fact, low concentration solutions are not generally used in industry and, furthermore, the presence of organic contaminants prevents the use of the said solutions for the purposes for which they are normally intended.

It is known that the absorption of gaseous hydrogen chloride in water is greatly influenced by the temperature, since the vapour pressure of aqueous solutions of hydrogen chloride with a concentration exceeding 20 percent by weight is high even at low temperature. The considerable rise in temperature deriving from the process of solubilisation of the gaseous hydrogen chloride tends to increase the partial pressure of this latter on the solution and therefore to inhibit the absorption process. Consequently, when it is desired to obtain aqueous solutions of hydrogen chloride with an acid concentration exceeding 20 percent by weight, by absorption of gaseous hydrogen chloride in water, it becomes necessary to disperse the heat of solubilisation.

Such subtraction of heat may be carried out in two ways, in other words by cooling surfaces or by evaporation of the water, so achieving isothermal absorption or respectively adiabatic absorption.

According to a known process, aqueous solutions of hydrogen chloride are prepared with an acid concentration equal to approximately 32 to 33 percent by weight, by supplying gaseous hydrogen chloride to the base of an absorption column containing packing elements; the water is supplied to the top of the column itself. By working adiabatically, an aqueous solution containing 32 to 33 percent by weight approximately of hydrogen chloride is discharged at the base of the column.

This manner of working has certain disadvantages, particularly in the case of industrial processes in which the absorption of large quantities of hydrogen chloride is required.

In these cases, in fact, large diameter graphite columns are required which are not easily available commercially and furthermore, too, the working of such large diameter columns is not easy.

Therefore, according to another known technique, aqueous hydrogen chloride with a high concentration is obtained by an isothermal process in which the gaseous hydrogen chloride is absorbed at a constant temperature in a film absorber.

Such an absorber consists of a tube exchanger, the gaseous hydrogen chloride and the solution flowing in equicurrent through the said tubes, the heat of the solution being exchanged by means of water circulating outside the tubes.

This procedure, while eliminating various disadvantages relative to the adiabatic absorption process, is not completely satisfactory if it is necessary to absorb gaseous hydrogen chloride which is contaminated by organic impurities.

In fact, the isothermal process does not allow the elimination of the said organic impurities and in the end an aqueous solution of hydrogen chloride is obtained which has undesired characteristics.

It has now been found that the drawbacks of the prior art may be eliminated from the production of aqueous solutions of hydrogen chloride of high concentration, by the absorption of gaseous hydrogen chloride which is contaminated by the presence of substances of an organic nature.

The process of the present invention consists essentially in subjecting to isothermal absorption a fraction of the gaseous hydrogen chloride supplied so as to produce an aqueous solution having an acid concentration equal to or less than approximately 20 percent by weight, in subjecting the remaining fraction of the gaseous hydrogen chloride to adiabatic absorption using the dilute solution discharged from the isothermal absorption, and in separating the organic products by decanting the solution discharged after isothermal absorption, together with the products obtained at the head of the adiabatic absorption column. More particularly according to the method of the present invention, a fraction of the impure gaseous hydrogen chloride supplied is fed to the top of a graphite exchanger.

Water is also supplied to the head of such an exchanger.

Inside the tubes of the exchanger, absorption of the gaseous hydrogen chloride takes place, while the heat of absorption is carried away by water circulating on the outside of the tubes. In this phase, absorption is carried out at a temperature of 15° to 50°C and the rates of supply are so regulated that virtually complete absorption of the acid is achieved, with production of an aqueous solution which has an acid content equal to or less than 20 percent by weight and preferably 17 to 19 percent by weight. The said solution, discharged at the base of the exchanger, is supplied to a decanter.

Since in the same decanter there is a concentration of the products of organic nature, due to the simultaneous supply of the products from the head of the adiabatic absorption column, the separation is noted of an organic stratum and an aqueous stratum of hydrogen chloride.

This latter is supplied to the head of an adiabatic absorption column, while to the base of the said column is supplied the remaining fraction of the gaseous hydrogen chloride containing the organic contaminants.

Adiabatic absorption is carried out in this column by working at a base temperature of approximately 70°C and a head temperature of approximately 108°C. In this way, at the base of the adiabatic absorption column, an aqueous solution is separated off which has an acid content equal to 32 to 33 percent by weight, which is virtually free from organic contaminants.

At the head of the column, a gaseous flow is separated off which contains not only water and hydrogen chloride but also the organic contaminants. This gaseous fraction is condensated by cooling and is passed to the decanter into which also flows the dilute aqueous solution discharged at the base of the graphite exchanger.

By means of the process according to the present invention, aqueous solutions of hydrogen chloride are obtained which have a high acid concentration and which are virtually bereft of pollutants of an organic nature, so avoiding the disadvantages of the prior art processes.

The process described is particularly advantageous in the case of absorption of large quantities of gaseous hydrogen chloride, such as for example with supply rates equal to or greater than approximately 200 kg/hr.

The process of the present invention is particularly applicable to those processes for the production of linear alkyl benzenes (useful as intermediate products for biodegradable detergents) in which the linear paraffins are chlorinated by gaseous chlorine, and the benzene is then subjected to alkylation by means of the said chlorinated product.

In this process, hydrogen chloride develops which is contaminated by organic substances, both in the chlorination phase and in the alkylation phase. By subjecting such hydrogen chloride to absorption by using the process of the present invention, aqueous solutions of the acid are obtained which have an organic substance content below 10 ppm.

Referring to the attached FIGURE, reference numeral 1 shows the graphite tube exchanger, while reference numeral 2 denotes the column containing packing elements for adiabatic absorption.

A fraction (typically 47 percent) of the gaseous hydrogen chloride supplied is fed through the line 3 while water is supplied through the line 4.

5 and 6 indicate the lines for the supply and discharge repsectively of the cooling water which circulates on the outside of the exchanger tubes.

The aqueous solution of hydrogen chloride is discharged through 7 with a typical acid concentration of 18 to 19 percent by weight, at a temperature of approximately 25°C.

This solution, in which the organic compounds are still present at least partly in dissolved form, is passed to the decanter 12 together with the products separated at the head of the column 2.

The aqueous stratum of acid is drawn off from the decanter 12 and supplied through the line 7 to the head of the column 2.

The remaining fraction (typically 53 percent) of the gaseous hydrogen chloride is supplied to the base of the column 2 through the line 8.

Vapour forms in the column 2 and organic compounds are eliminated at the head by stripping. Thus, the vapours constituted by water and hydrogen chloride, besides organic compounds, are collected through the line 10 and these vapours are condensed in the exchanger 11 and the liquid is supplied to the decanter 12.

Through the line 8', the aqueous solution of hydrogen chloride is drawn off at the base of the column 2 with an acid concentration equal to 32 to 33 percent by weight, virtually free from impurities. At 70°C, this solution is cooled in the exchanger 9 prior to recovery. The light stratum or organic products is discharged from the decanter through the line 13.

EXAMPLE

A gaseous flow of hydrogen chloride obtained as the by-product of a process for producing linear alkyl benzenes, in which the normal paraffins (having from 10 to 14 carbon atoms) are chlorinated by means of gaseous chlorine and the benzene is then catalytically alkylated by such chlorinated paraffins, is subjected to washing.

In particular, the gaseous flow supplied is constituted by the hydrogen chloride obtained in the alkylation phase and that obtained in the chlorination phase and has an organic compound content of up to 1 percent by weight.

Referring to the attached FIGURE, 310 kg/hr of such impure hydrogen chloride are supplied through the line 3 while 1,400 kr/hr of water are supplied through the line 4.

Cooling water (at approximately 20°C) is supplied to the exchanger through the line 5.

The aqueous solution of hydrogen chloride discharged at the base of the exchanger 1 is supplied to the decanter 12 through the line 7.

Decantation takes place at a temperature of approximately 25°C. The aqueous stratum of hydrogen chloride is discharged from the decanter 12 through the line 7 at the rate of approximately 1,800 kg/hr.

This aqueous stratum is supplied to the column 2 and to this column, through the line 8, a flow of the previously described gaseous hydrogen chloride is supplied at the rate of approximately 660 kg/hr.

Adiabatic absorption occurs in the column 2, and at the base of the said column, aqueous hydrogen chloride is discharged with an acid concentration equal to approximately 32 percent, at the rate of approximately 2,050 kg/hr.

Upon analysis, such acid solution exhibited an organic impurities content of below 10 ppm. The gaseous products developed at the head of the column 2 (approximately 100 kg/hr) are cooled in the exchanger 11 and passed to the decanter 12, by line 10.

From the decanter, the stratum of organic substances is separated through the line 13.

What we claim is:

1. Process for the manufacture of concentrated aqueous solutions of hydrogen chloride by absorption of gaseous hydrogen chloride which is contaminated by substances of an organic nature, characterised:

by the supply of a fraction of the said gaseous hydrogen chloride to the head of a graphite exchanger together with water and by the performance in the said exchanger of isothermal absorption with production of aqueous hydrogen chloride with an acid concentration equal to or less than approximately 20 percent by weight;

by the remaining fraction of the said gaseous hydrogen chloride being supplied to the base of an adiabatic absorption column;

by the aqueous solution of hydrogen chloride originating from isothermal absorption being subjected to decantation together with the cooled products discharged at the head of the adiabatic absorption column;

by the organic phase being discharged from the said decanter;

by the aqueous phase of the hydrogen chloride being discharged from the said decanter and supplied to the head of the adiabatic absorption column;

by recovery of the aqueous solution of hydrogen chloride with an acid concentration equal to 32 to 33 percent by weight at the base of the adiabatic absorption column.

2. Process according to claim 1, characterised in that isothermal absorption is carried out at temperatures of 15° to 50°C.

3. Process according to claim 1, characterised in that isothermal absorption produces an aqueous solution of hydrogen chloride with an acid concentration between 17 and 19 percent by weight.

4. Process according to claim 1, characterised in that a fraction corresponding to 47 percent by weight of gaseous hydrogen chloride supplied is subjected to isothermal absorption, the remaining fraction being subjected to adiabatic absorption.

* * * * *